(12) United States Patent
Pruet et al.

(10) Patent No.: US 6,566,644 B1
(45) Date of Patent: May 20, 2003

(54) OPTICAL FIBER SORTER SYSTEM AND METHOD

(75) Inventors: James D. Pruet, Garland, TX (US); Kerry A. Wilson, Royse City, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/465,241

(22) Filed: Dec. 15, 1999

(51) Int. Cl.[7] .............................................. H01J 40/14
(52) U.S. Cl. ..................... 250/221; 356/73.1; 356/238.1
(58) Field of Search .......... 250/227.11, 227.14–227.17, 250/221, 222.1, 223 R; 356/73.1, 239.2, 237.1, 239.1, 238.1, 238.2, 241.6

(56) References Cited

U.S. PATENT DOCUMENTS 3,757,942 A * 9/1973 Gunn .......................... 209/3.3
5,139,150 A * 8/1992 Fuller, Jr. et al. ............ 209/576
5,995,212 A * 11/1999 Dar et al. ................... 356/73.1

* cited by examiner

Primary Examiner—Que T. Le
Assistant Examiner—Thanh X. Luu
(74) Attorney, Agent, or Firm—Baker Botts L.L.P.

(57) ABSTRACT

An optical fiber sorter system (10) includes a measurement system (14) operable to determine a measurement characteristic of an optical fiber. The system (10) also includes a guide system (12) operable to direct the optical fiber to a measurement position (54) relative to the measurement system (14). The system also includes a collection system (16) disposed adjacent an outlet (126) of the guide system (12). The collection system (16) includes a plurality of receivers (24) for receiving the optical fibers from the guide system (12). The system further includes a controller (18) operable to automatically position a particular receiver (24) of the collection system (16) adjacent the outlet (126) of the guide system (12) corresponding to the measurement characteristic of the optical fiber.

25 Claims, 6 Drawing Sheets

OPTICAL FIBER SORTER SYSTEM AND METHOD

TECHNICAL FIELD OF THE INVENTION

This invention relates in general to the field of electro-optics and, more particularly, to an optical fiber sorter system and method.

BACKGROUND OF THE INVENTION

There are numerous methods and systems for detecting radiation. In one type of detector, photocathodes are used in conjunction with microchannel plates (MCPs) to detect low levels of electromagnetic radiation. Photocathodes emit electrons in response to exposure to photons. The electrons may then be accelerated by electrostatic fields toward a microchannel plate. A microchannel plate is typically manufactured from lead glass fibers and has a multitude of channels, each one operable to produce cascades of secondary electrons in response to incident electrons. A receiving device then receives the secondary electrons and sends out a signal responsive to the electrons. Since the number of electrons emitted from the microchannel plate is much larger than the number of incident electrons, the signal produced by the device is stronger than it would have been without the microchannel plate.

One example of the use of a photocathode with a microchannel plate is an image intensifier tube. The image intensifier tube is used in night vision devices to amplify low light levels so that the user can see even in very dark conditions. In the image intensifier tube, a photocathode produces electrons in response to photons from an image. The electrons are then accelerated to the microchannel plate, which produces secondary emission electrons in response. The secondary emission electrons are received at a phosphor screen or, alternatively, a charge coupled device (CCD), thus producing a representation of the original image.

Another example of a device that uses a photocathode with a microchannel plate is a scintillation counter used to detect particles. High-energy particles pass through a scintillating material, thereby generating photons. Depending on the type of material used and the energy of the particles, these photons can be small in number. A photocathode in conjunction with a microchannel plate can be used to amplify the photon signal in similar fashion to an image intensifier tube. The detector can thus be used to detect faint particle signals and to transmit a signal to a device, e.g., a counter, that records the particle's presence.

Microchannel plates are generally fabricated by heating a rod of core glass material surrounded by a sleeve of cladding glass material in a glass drawing furnace. The glass is drawn for fusing the core glass to the surrounding glass sleeve to produce a glass clad glass fiber of relatively small cross section. The glass fiber is then cut into smaller length portions and the portions assembled into a bundle. The bundle is then repeatedly heated, drawn and cut to produce glass clad glass fibers of relatively small hexagonal cross section. Hexagonal fibers having substantially equal cross section are then assembled into a second bundle. The second bundle is assembled within a pressing fixture, heated to the softening point, and pressed together to fuse the individual fibers together and to a surrounding sleeve. The composite fused bundle is then sliced transversely to form multiple plates which are etched to remove the core glass leaving a microchannel plate.

However, prior systems and methods for fabricating microchannel plates suffer several disadvantages. For example, fabricating the microchannel plate generally requires cross-sectionally measuring each hexagonal fiber to ensure that fibers having substantially equal cross section are bundled together to minimize gaps between the bundled fibers and maximize the quantity of channels in the microchannel plate. However, cross sectionally measuring each fiber is generally tedious and time consuming. Additionally, measurement variations along the length of the fiber may generally require calculating an average cross sectional measurement for the fiber prior to bundling the fiber with other fibers.

SUMMARY OF THE INVENTION

Accordingly, a need has arisen for a better technique having greater flexibility and control for fabricating a microchannel plate. In accordance with the present invention, an optical fiber sorter system and method are provided that substantially eliminates or reduces disadvantages and problems associated with previously developed systems and methods.

According to one embodiment of the present invention, an optical fiber sorter system includes a measurement system operable to determine a measurement characteristic of an optical fiber. The sorter system also includes a guide system operable to direct the optical fiber to a measurement position of the measurement system. The sorter system also includes a collection system disposed adjacent an outlet of the guide system. The collection system includes a plurality of receivers for receiving the optical fibers from the guide system. The sorter system further includes a controller operable to automatically position a particular receiver of the collection system adjacent the outlet of the guide system corresponding to the measurement characteristic of the optical fiber.

According to another embodiment of the present invention, a method for automatically sorting optical fibers includes guiding an optical fiber toward a measurement position of a measurement system using a guide system. The method also includes automatically determining a measurement characteristic of the optical fiber as the optical fiber passes through the measurement position of the measurement system. The method further includes automatically positioning one of a plurality of receivers of a collection system adjacent an output of the guide system to receive the optical fiber corresponding to the measurement characteristic of the optical fiber using a controller.

The technical advantages of the present invention include a system and method for automatically measuring and sorting optical fibers that substantially increases the uniformity of devices made with the sorted optical fibers, such as a microchannel plate. For example, according to one aspect of the present invention, optical fibers are transported through a guide system to a measurement system. The measurement system automatically determines measurement characteristic data of the optical fiber as the optical fibers travels through the guide system. The measurement characteristic data is transmitted to a controller. The controller automatically positions a collection system adjacent an outlet of the guide system to receive the optical fiber. The collection system may include a plurality of receivers each designated for receiving optical fibers having particular measurement characteristic values.

Another technical advantage of the present invention includes greater measurement characteristic data collection than prior systems and methods. For example, according to another aspect of the present invention, a feed system may be disposed adjacent the guide system to transport the optical fibers through the measurement position of the measurement system at a substantially constant rate and at a substantially fixed position relative to the measurement system, thereby providing increased control of the optical fiber during measurement characteristic data collection.

Other technical advantages of the present invention will be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in connection with the accompanying drawings, in which.

DETAILED DESCRIPTION OF THE INVENTION

Embodiments of the present invention and the advantages thereof are best understood by referring to the following description and drawings, wherein like numerals are used for like and corresponding parts of the various drawings.

Figure 1:
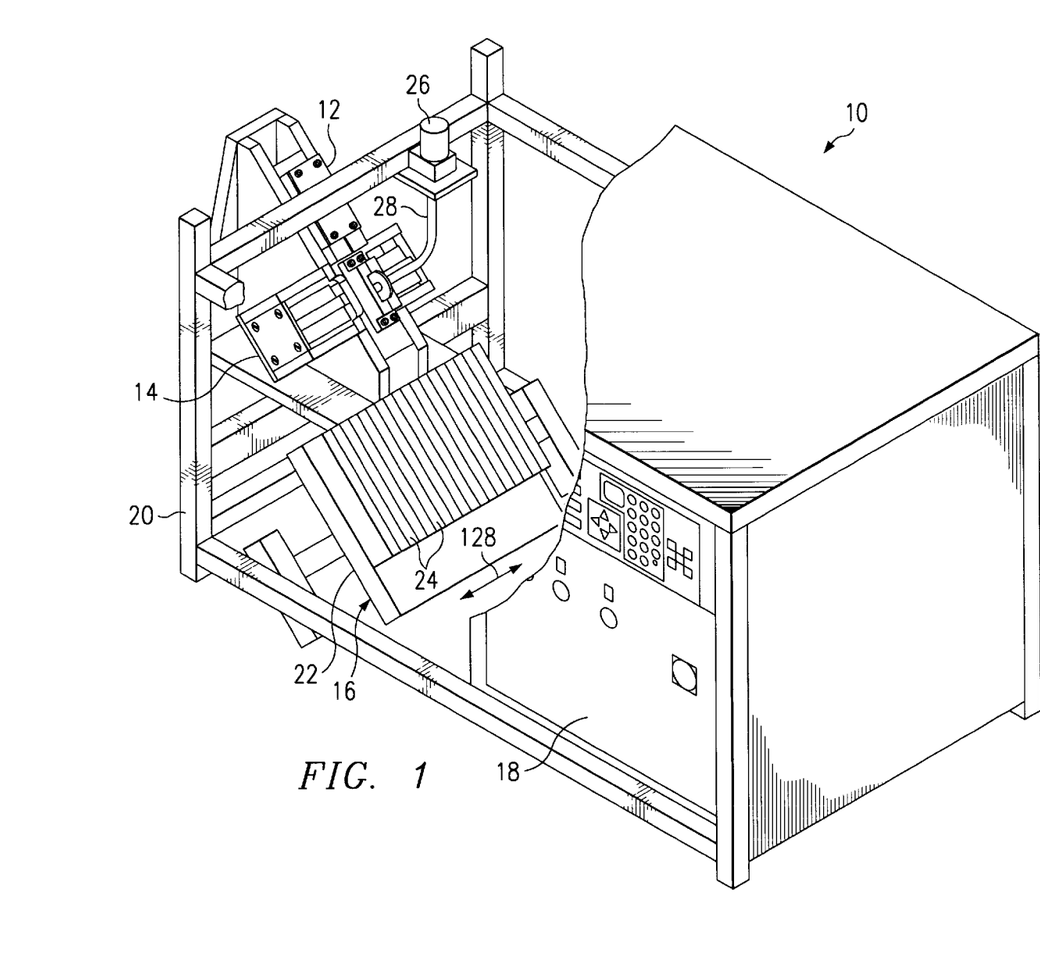
FIG. 1 is diagram illustrating an optical fiber sorting system in accordance with an embodiment of the present invention.

FIG. 1 is a diagram illustrating a fiber sorter system 10 in accordance with an embodiment of the present invention. System 10 comprises a guide system 12, a measurement system 14, a collection system 16, and a controller 18. As illustrated in FIG. 1, guide system 12, measurement system 14, collection system 16, and controller 18 may be mounted on a support 20 in close proximity to each other to form a modular and transportable system 10. However, guide system 12, measurement system 14, collection system 16, and controller 18 may be otherwise positioned relative to each other.

Briefly, fiber sorter system 10 automatically measures and sorts fibers, such as optical fibers (not explicitly shown) used to manufacture a microchannel plate. For example, optical fibers may be received by guide system 12 and directed toward measurement system 14. Measurement system 14 automatically determines measurement characteristics of the optical fiber. For example, measurement system 14 may be used to obtain cross-sectional measurement data, height data, width data, length data, geometric configuration data, or other measurement characteristics corresponding to the optical fiber. The measurement characteristic data is then transmitted to controller 18 for processing.

Controller 18 controls collection system 16 for receiving and sorting the optical fibers based on the measurement characteristic data. For example, collection system 16 may comprise a collector 22 having two or more receivers 24 for receiving the optical fibers from guide system 12. Receivers 24 may comprise bins or other suitably configured receptacles for receiving the optical fibers. Based on the measurement data, controller 18 controls movement of collector 22 to position a particular receiver 24 adjacent guide system 12 to receive the optical fiber corresponding to the measurement characteristic data of the optical fiber. Collection system 16 may include a rack-and-pinion system, belt drive system, or other suitable system for providing movement of collector 22 relative to guide system 12.

Controller 18 comprises a computer, workstation, minicomputer, mainframe or other computing device having a volatile or non-volatile memory. Controller 18 may be used to perform various data transformations and calculations based on measurement data received from measurement system 14. For example, controller 18 may be programmed or configured such that each receiver 24 is assigned a particular measurement characteristic value or range of measurement characteristic values. In operation, measurement characteristic data for a particular optical fiber may match the measurement characteristic value or fall within the range of measurement characteristic values assigned to a particular receiver 24. Thus, controller 18 automatically controls movement of collection system 16 relative to guide system 12 to position a particular receiver 24 adjacent guide system 12 to receive the optical fiber corresponding to the measurement characteristic value of the optical fiber.

Controller 18 may also be configured to automatically to determine an average measurement characteristic of the optical fiber using a plurality of measurement characteristic values provided by measurement system 14. For example, measurement system 14 may be configured such that a plurality of measurement characteristic values are determined for the optical fiber as the optical fiber travels adjacent measurement system 16. Controller 18 may automatically determine an average measurement characteristic value for the optical fiber and position a receiver 24 to receive the optical fiber corresponding to the average measurement characteristic value computed for the optical fiber.

Fiber sorter system 10 may also comprise a drive system 26 to facilitate transportation of the fibers 12 adjacent measurement system 14. For example, drive system 26 may comprise an electric, hydraulic, pneumatic or other suitable motor or power supply to facilitate transportation of the optical fibers adjacent measurement system 14. Drive system 26 may be coupled to system 10 using a flexible coupling 28. However, other suitable methods or devices may be used to couple drive system 26 to system 10. The transfer of optical fibers adjacent measurement system 14 will be described in greater detail below in conjunction with FIGS. 6 and 7.

Figure 2:
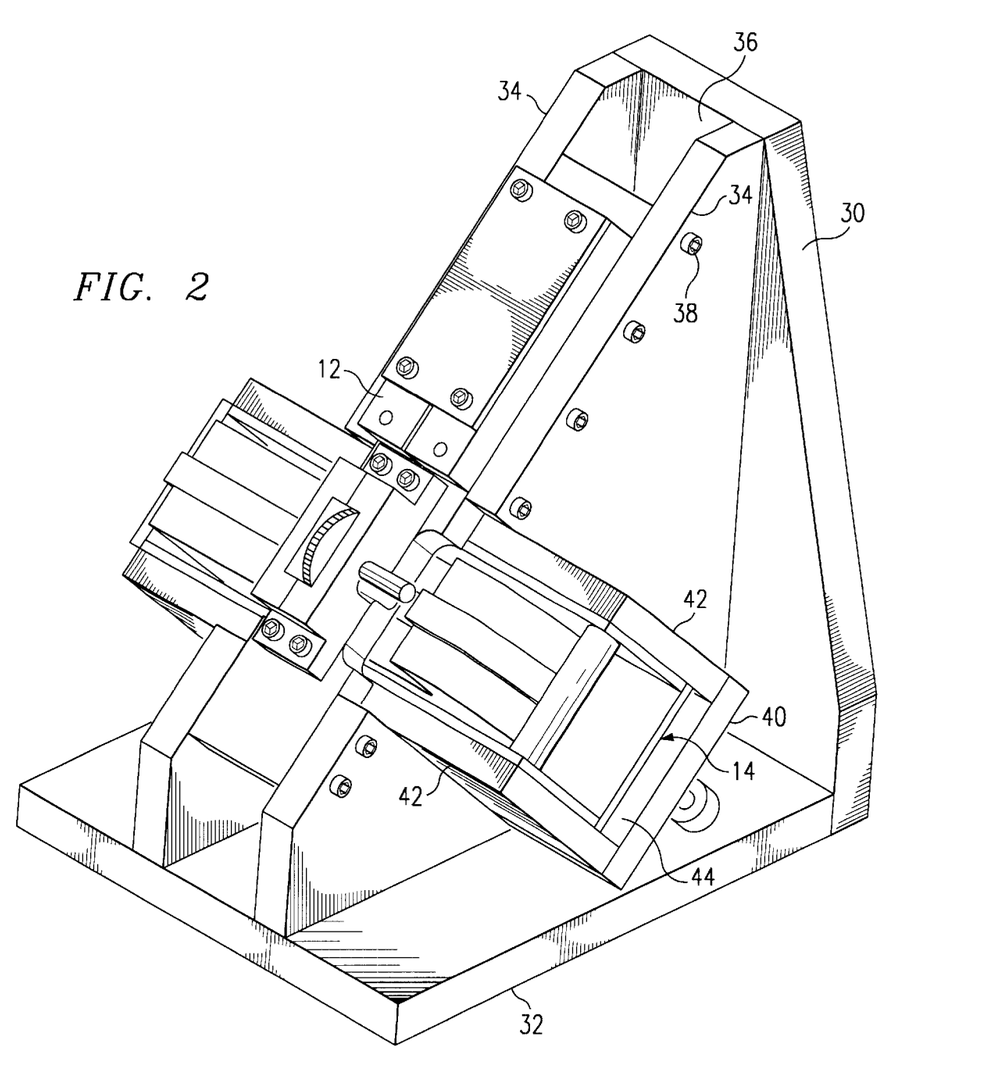
FIG. 2 is a diagram illustrating a measurement system and a guide system of the sorter system illustrated in FIG. 1 in accordance with an embodiment of the present invention.

FIG. 2 is a diagram illustrating guide system 12 and measurement system 14 in accordance with an embodiment of the present invention. Guide system 12 and measurement system 14 are coupled to a support 30 such that guide system 12 is disposed at an angle or incline relative to a surface 32 of support 30 such that gravitational forces act upon the optical fibers to draw the optical fibers downwardly through guide system 12 toward measurement system 14.

Additionally, disposing guide system 12 at an angle relative to surface 32 of support 30 facilitates alignment of the fiber relative to measurement system 14 for obtaining various measurement characteristic data corresponding to the optical fiber. For example, the optical fibers may be fabricated having a generally hexagonal configuration. Thus, gravitational forces may act on the optical fiber to position a side or flat of the hexagonally configured optical fiber in contact with a surface of guide system 12 to geometrically align the optical fiber relative to measurement system 14 to accommodate a particular measurement characteristic evaluation as the optical fiber travels adjacent measurement system 14. However, other suitable orientations of guide system 12 and measurement system 14 may be used.

As illustrated in FIG. 2, support 30 comprises spaced apart support walls 34 defining a channel 36 for receiving guide system 12. Thus, guide system 12 may be disposed within channel 36 and removably coupled to support 30 using fasteners 38. However, other suitable methods or devices may be used to secure guide system 12 to support 30.

Support 30 also comprises a support base 40 and spaced apart support walls 42 disposed substantially orthogonal to support walls 34 for receiving measurement system 14. For example, support walls 42 generally define a channel 44 for receiving measurement system 14, and measurement system 14 may be releasably secured to support walls 42 using fasteners (not explicitly shown). However, other suitable methods or devices may be used to secure measurement system 14 adjacent guide system 12.

In the embodiment illustrated in FIG. 2, measurement system 14 is disposed substantially orthogonal to guide system 12 such that measurement data may be obtained from a position substantially normal to the optical fibers as the optical fibers travel downwardly within guide system 12. For example, disposing measurement system 14 substantially orthogonal to the travel path of the optical fibers provides increased accuracy of cross-sectional or other measurement characteristic data of the optical fibers as the optical fibers travel adjacent measurement system 14. However, measurement system 14 may be disposed at other suitable orientations relative to the optical fibers to obtain various measurement characteristic data.

Figure 3:
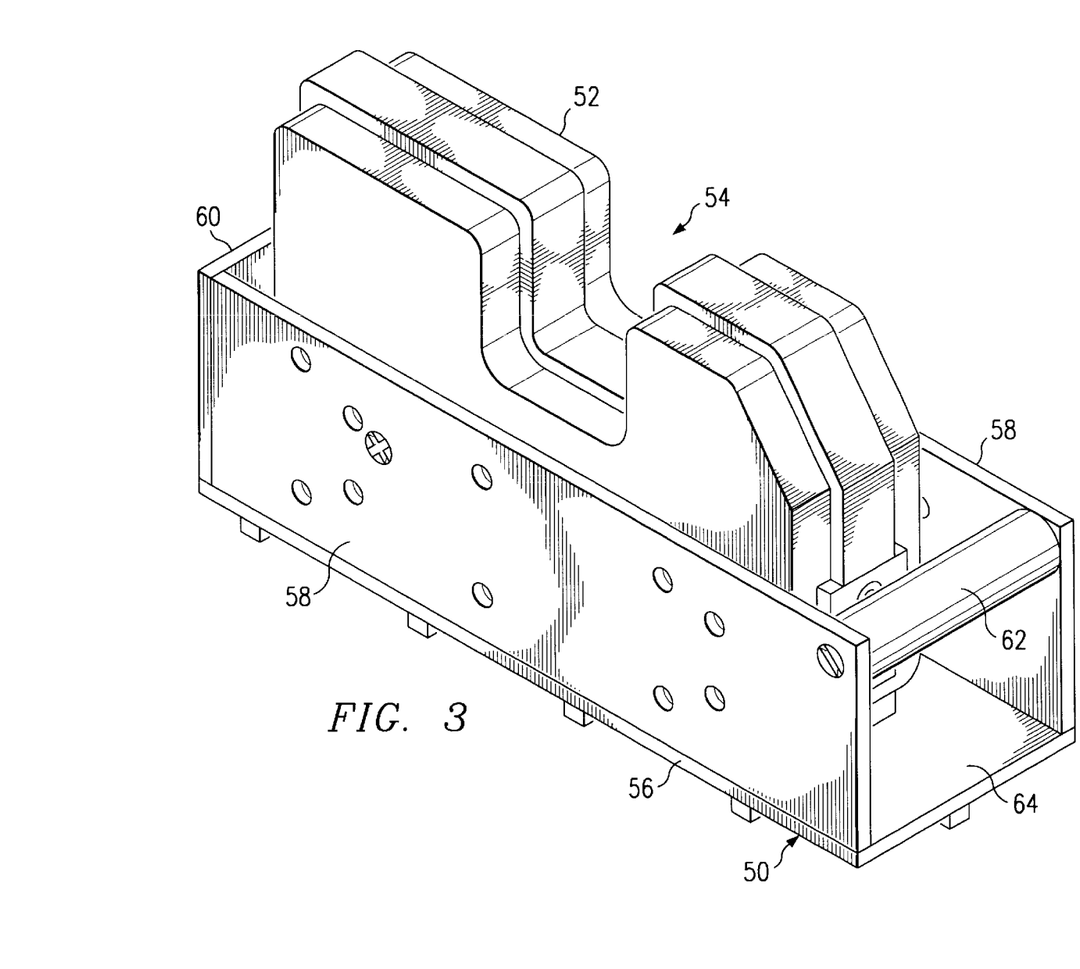
FIG. 3 is a diagram illustrating the measurement system illustrated in FIG. 2 in accordance with an embodiment of the present invention.

FIG. 3 is a diagram illustrating measurement system 14 in accordance with an embodiment of the present invention. In this embodiment, measurement system 14 comprises a cradle 50 for retaining a measurement device 52 used to obtain various measurement characteristic data of the optical fibers. In the embodiment illustrated in FIG. 3, measurement device 52 comprises a laser micrometer for determining cross-sectional measurement data of the optical fibers as the optical fibers travel through a measurement position 54 of measurement device 52. However, other suitable types of measurement devices 52 may be used for determining other types of measurement characteristic data of the optical fibers.

Cradle 50 comprises a base 56, a plurality of spaced apart side walls 58, and an end wall 60. Cradle 50 may also comprise a spacer 62 disposed at an end of cradle 50 opposite end wall 60 to provide support to cradle 50 and provide access to measurement device 52. For example, power supply and data communication connections (not explicitly shown) may be connected to measurement device 52 through an opening 64 in cradle 50. Measurement device 52 may be secured within cradle 50 using fasteners (not explicitly shown). However, other suitable methods or devices may be used to secure measurement device 52 to cradle 50.

Figure 4:
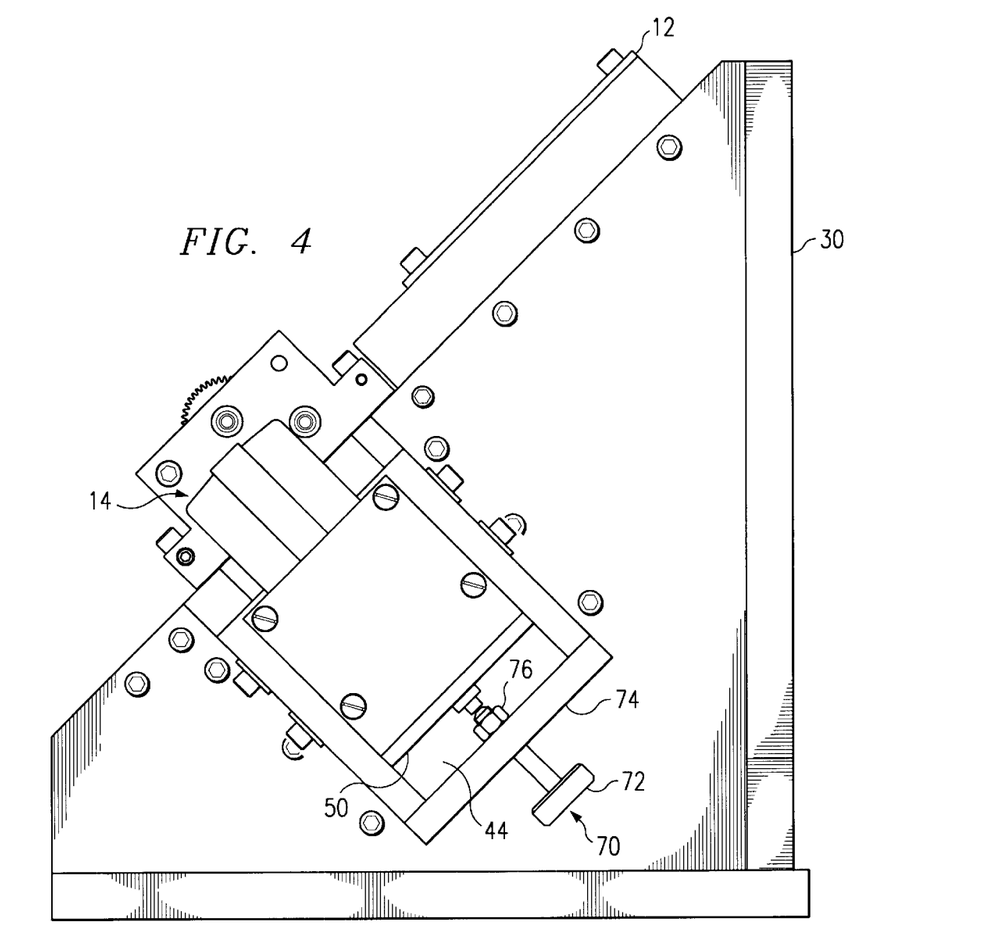
FIG. 4 is a diagram illustrating a side view of the measurement system and the guide system illustrated in FIG. 2 in accordance with an embodiment of the present invention.

FIG. 4 is a diagram illustrating a side view of guide system 12 and measurement system 14 in accordance with an embodiment of the present invention. As illustrated in FIG. 4, cradle 50 and measurement device 52 are disposed within channel 44 of support 30. System 10 also comprises an adjustment system 70 for modifying a position and/or orientation of measurement system 14 relative to guide system 12. For example, in the embodiment illustrated in FIG. 4, adjustment system 70 comprises a rotatable fastener 72 disposed on each side of channel 36 and coupled to support 30 for manipulating a position and/or angular orientation of measurement system 14 relative to guide system 12. Each fastener 72 may threadably engage an internally threaded opening (not explicitly shown) in a support wall 74 of support 30. In operation, fasteners 72 may be rotated to adjust an extension of fasteners 72 through support wall 74 to contact and modify a positional and/or angular orientation of cradle 50 relative to support 30 and guide system 12. Once a desired positional and/or angular orientation of measurement system 14 is obtained, a nut 76 may be used to secure fastener 72 in the desired position. However, suitable methods or devices may be used to provide positional and/or angular control of measurement system 14 relative to guide system 12.

Thus, adjustment system 70 provides alignment of measurement position 54 of measurement system 14 with guide system 12 and the position of the optical fibers as the optical fibers travel downwardly within guide system 12. Therefore, the present invention provides greater accuracy than prior systems and methods by providing adjustment of measurement system 14 relative to the position of the optical fibers to increase measurement characteristic data accuracy.

Figure 5:
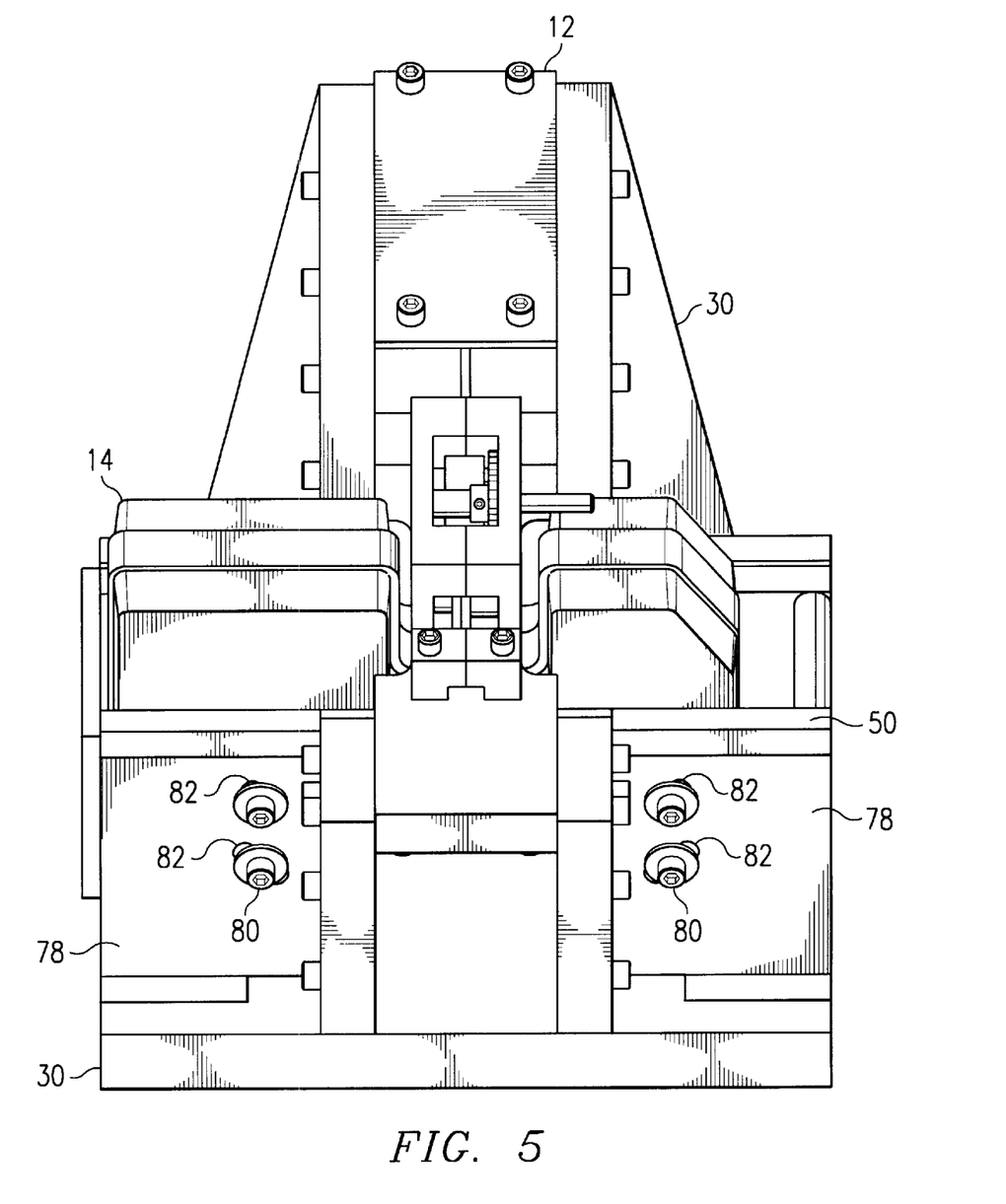
FIG. 5 is a diagram illustrating another view of the measurement system and the guide system illustrated in FIG. 2 in accordance with an embodiment of the present invention.

FIG. 5 is a diagram illustrating another view of measurement system 14 and guide system 12 in accordance with an embodiment of the present invention. As illustrated in FIG. 5, cradle 50 of measurement system 14 may be secured to support walls 78 of support 30 using fasteners 80. However, other suitable methods or devices may be used for securing measurement system 14 to support 30. Additionally, support walls 78 comprise a plurality of openings 82 for receiving fasteners 80 and for providing positional and/or angular manipulation of measurement system 14 relative to guide system 12 using adjustment system 70. For example, as illustrated in FIG. 5, openings 82 may be constructed having a generally slotted configuration to provide angular and/or positional movement of measurement system 14 within channel 44 of support 30. As described above in conjunction with FIG. 4, adjustment system 70 may be used to modify a positional and/or angular orientation of measurement system 14 within channel 44. Once the desired positional and/or angular orientation of measurement system 14 is obtained, measurement system 14 may be secured within channel 44 using fasteners 80.

Figure 6:
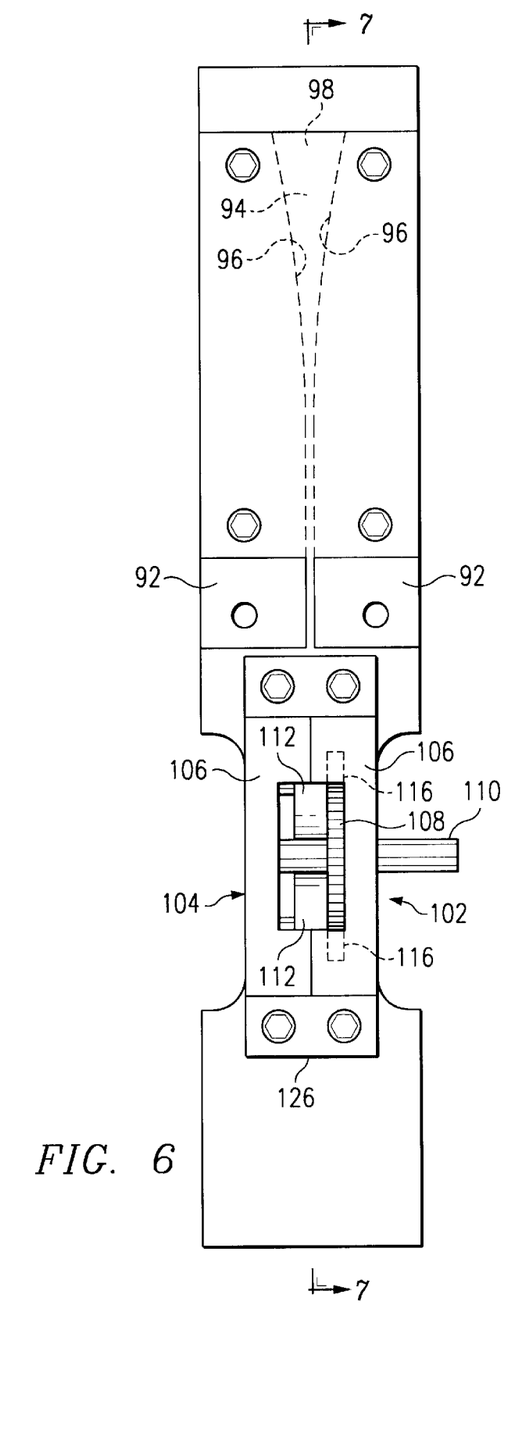
FIG. 6 is a diagram illustrating the guide system illustrated in FIG. 2 in accordance with an embodiment of the present invention.
Figure 7:
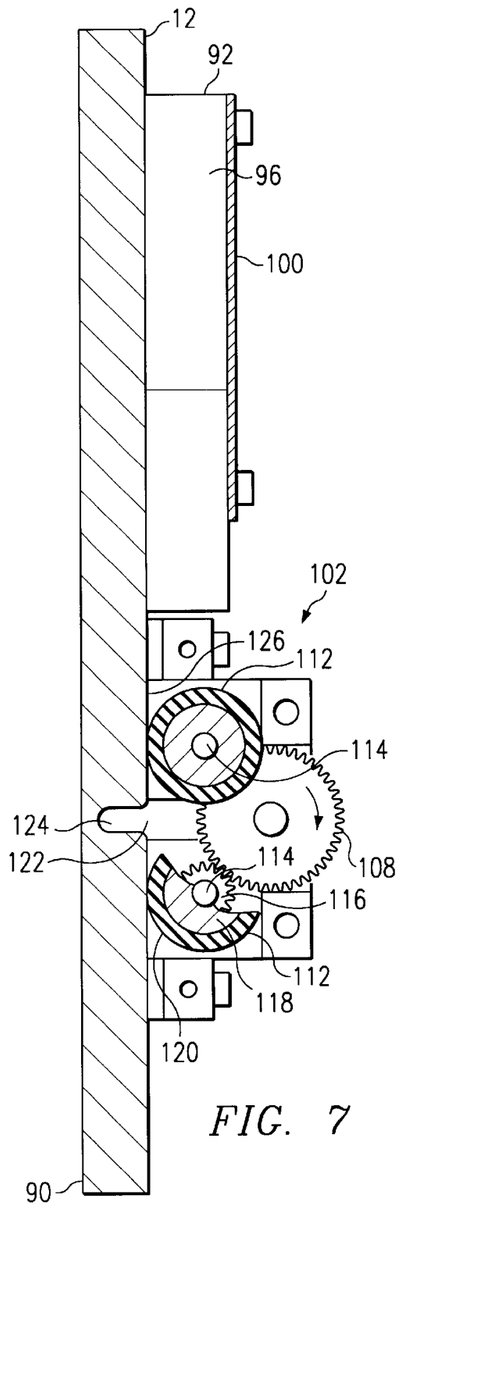
FIG. 7 is a diagram illustrating a section view of the guide system illustrated in FIG. 6 taken along the line 7—7 of FIG. 6.

FIG. 6 is a diagram illustrating guide system 12 in accordance with an embodiment of the present invention, and FIG. 7 is a diagram illustrating a section view of guide system 12 illustrated in FIG. 6 taken along the line 7—7 of FIG. 6. Guide system 12 comprises a base 90 and a plurality of spaced apart guides 92 coupled to base 90. Guides 92 are positioned on base 90 to form a passage 94 between adjacent guides 92. Additionally, each guide 92 comprises a tapered side wall 96 for directing optical fibers received at an inlet 98 of guide system 12 into passage 94. Guide system 12 may also comprise a cover 100 coupled to guides 92 and disposed over passage 94 to substantially prevent optical fibers from exiting passage 94 of guide system 12.

System 10 also comprises a feed system 102 for transporting the fibers adjacent measurement system 14 at a substantially constant rate or velocity. Feed system 102 comprises a housing 104 coupled to base 90. In the embodiment illustrated in FIGS. 6 and 7, housing 104 is constructed having symmetrically opposed housing units 106; however, housing 104 may also comprise a single piece construction or may comprise additional housing units 106.

Feed system 102 also comprises a drive gear 108 rotatably coupled to housing 104. Drive gear 108 may be rotatably coupled to housing 104 using a bearing (not explicitly shown) or other suitable device to provide rotational movement of drive gear 108 relative to housing 104. An axle 110 of drive gear 108 may be coupled to drive system 26 illustrated in FIG. 1 to receive rotational input for drive gear 108.

Referring to FIGS. 6 and 7, feed system 102 also comprises one or more grippers 112 for transporting the optical fibers through measurement position 54. For example, in the embodiment illustrated in FIGS. 6 and 7, grippers 112 may comprise gripping wheels 113 rotatably coupled to housing 104. Each gripping wheel 113 may be fixedly coupled to a shaft 114, and each shaft 114 may be rotatably coupled to housing 104 through a bearing (not explicitly shown). However, other suitable methods or devices may be used for rotatably coupling gripping wheels 113 to housing 104. In operation, drive gear 108 engages a corresponding gear 116 coupled to each shaft 114 to transfer rotational motion of drive gear 108 to each gripping wheel 113.

Each gripping wheel 113 comprises an inner portion 118 and an outer portion 120. Inner portion 118 may be constructed from steel, aluminum or other suitable material to provide structural integrity for securing gripping wheel 113 to shaft 114. For example, inner portion 118 may be secured to shaft 114 using a set screw (not explicitly shown) inserted though an internally threaded opening (not explicitly shown) in inner portion 118 to contact shaft 114. However, other suitable methods or devices may be used to secure gripping wheel 113 to shaft 114.

Outer portion 120 of gripping wheel 113 may be constructed from a generally pliable material, such as plastic, vinyl, or other suitable pliable and non-abrasive materials, such that outer portion 120 secures and draws the optical fibers received from passage 94 through measurement position 54 while substantially preventing damage to the optical fibers. For example, outer portion 120 may be molded or bonded to inner portion 118. However, other suitable methods or devices may be used to provide transportation of the optical fibers received from passage 94 through measurement position 54.

Thus, in operation, rotational input is received at drive gear 108 and is transferred to each gripping wheel 113, thereby causing a substantially equal rotational rate of each gripping wheel. As the optical fibers travel downwardly within passage 94, gripping wheels 113 secure the optical fibers against a surface 121 of guide system 12 and rotate relative to housing 104 to transport the optical fibers through measurement position 54 at a substantially constant rate. For example, gripping wheels 113 may be disposed in contact with or slightly spaced apart from surface 121 of base 90 to secure and transport the optical fibers through measurement position 54. Additionally, grippers 112 operate to secure the optical fibers in a fixed position relative to measurement system 14, thereby providing greater accuracy of measurement characteristic data than prior systems and methods.

As best illustrated in FIG. 7, housing 104 is constructed having a recessed portion 122 disposed adjacent a recessed portion 124 of base 90. In operation, measurement system 14 is disposed adjacent feed system 102 such that measurement characteristic data may be obtained as the optical fibers are transported adjacent recessed portions 122 and 124. For example, as described above, measurement device 52 may comprise a laser micrometer. Thus, the laser micrometer may be disposed adjacent guide system 12 and feed system 102 such that measurement characteristic data may be obtained for the optical fibers by focusing the laser source of the laser micrometer through recessed portions 122 and 124 as the optical fibers are transported adjacent recessed portions 122 and 124. Thus, measurement position 54 may be aligned with recessed portions 122 and 124 to obtain measurement characteristic data of the optical fibers as the optical fibers travel through measurement position 54.

In operation, the optical fibers are delivered to guide system 12 at inlet 98 and travel downwardly within passage 94 toward feed system 102. As described above in conjunction with FIG. 2, guide system 12 may be disposed having an angular relationship relative to support 30 such that gravitational forces facilitate movement of the fibers downwardly within passage 94 toward feed system 102. Once the fibers reach feed system 102, grippers 112 secure and transport the optical fiber at a substantially constant rate adjacent measurement system 14.

As described above, measurement system 14 may be disposed relative to recessed portions 122 and 124 to obtain measurement characteristic data corresponding to the optical fiber as the optical fiber is drawn through feed system 102. Thus, measurement system 14 may be used to obtain measurement characteristic data of the optical fiber at various locations along a longitudinal length of the optical fiber as the optical fiber is drawn through feed system 102. Therefore, the present invention provides greater accuracy of optical fiber measurement characteristic data than prior systems by obtaining measurement characteristic data of the optical fiber at various locations along a longitudinal length of the optical fiber.

Once the optical fiber is drawn through feed system 102, the optical fiber exits an outlet 126 of guide system 12. As described above in conjunction with FIG. 1, collection system 16 is disposed adjacent outlet 126 of guide system 12 such that collector 22 of collection system 16 may be positioned relative to outlet 126 for receiving the fibers from guide system 12.

Measurement system 14 transmits the measurement characteristic data to controller 18 for processing. Controller 18 then controls movement of collection system 16 relative to outlet 126 to position a receiver 24 adjacent outlet 126 to receive the optical fiber as the optical fiber exits outlet 126. As best illustrated in FIG. 1, collection system 16 may be configured for translational movement relative to guide system 12 in the direction indicated generally by arrow 128. However, other suitable methods, devices and/or positional movement of collection system 16 may be used for receiving the optical fibers as the optical fibers exit outlet 126 of guide system 12.

Therefore, the present invention provides greater efficiency and accuracy than prior systems and methods by providing automatic measurement and collection of the optical fibers used for fabricating a microchannel plate. For example, the optical fibers are received in collection system 16 such that each receiver 24 of collector 22 contains optical fibers having a substantially uniform configuration. Thus, the optical fibers contained within each receiver 24 may be used to form a microchannel plate having a desired optical fiber compaction rate and having decreased spacing between adjacent optical fibers of the microchannel plate.

Although the present invention and its advantages have been described in detail, it should be understood that various changes, substitutions and alterations can be made without departing from the spirit and scope of the present invention as defined by the appended claims.

What is claimed is:

1. An optical fiber sorter system comprising:
   a measurement system operable to determine a measurement characteristic of an optical fiber;
   a guide system operable to direct the optical fiber to and from the measurement system;
   at least one gripper operable to transport the optical fiber through a measurement position of the measurement system at a substantially constant rate, the at least one gripper further operable to secure the optical fiber in a fixed position relative to the measurement position;
   a collection system disposed adjacent an outlet of the guide system, the collection system comprising a plurality of receivers for receiving the optical fiber from the guide system; and
   a controller operable to automatically position a particular receiver of the collection system adjacent the outlet of the guide system corresponding to the measurement characteristic of the optical fiber.

2. The system of claim 1, wherein the measurement system comprises a laser micrometer.

3. The system of claim 1, wherein the guide system is disposed at an incline such that gravitational forces direct the optical fiber toward the measurement position.

4. The system of claim 1, wherein the at least one gripper comprises first and second gripping wheels disposed on opposite sides of the measurement position.

5. The system of claim 1, wherein the measurement system is operable to obtain a plurality of measurement characteristics of the optical fiber as the optical fiber passes through the measurement position, and wherein the controller is further operable to determine an average measurement characteristic for the optical fiber from the plurality of measurement characteristics.

6. The system of claim 5, wherein the controller is further operable to automatically position a particular receiver of the collection system adjacent the outlet of the guide system corresponding to the average measurement characteristics of the optical fiber.

7. The system of claim 1, wherein the controller is further operable to receive a plurality of input measurement ranges, each measurement range associated with a particular receiver of the collection system, and wherein the controller is further operable to automatically position a particular receiver of the collection system adjacent the output of the guide system corresponding to the measurement characteristic of the optical fiber and a particular measurement range.

8. The system of claim 1, further comprising an adjustment system operable to adjust a position of the measurement system to align the measurement position of the measurement system with a passage of the guide system.

9. The system of claim 1, wherein the measurement characteristic of the optical fiber is selected from the group consisting of cross-sectioned measurement data, height data, width data and length data.

10. The system of claim 1, wherein the at least one gripper comprises an inner portion and an outer portion, the outer portion formed from a non-abrasive material.

11. A method for automatically sorting optical fibers, comprising:
    guiding an optical fiber toward a measurement position of a measurement system using a guide system;
    retaining the optical fiber at a first location of the measurement system using a gripping wheel;
    rotating the gripping wheel at a substantially constant rate to transport the optical fiber through the measurement position;
    automatically determining a measurement characteristic of the optical fiber as the optical fiber passes through the measurement position of the measurement system; and
    automatically positioning one of a plurality of receivers of a collection system adjacent an output of the guide system to receive the optical fiber corresponding to the measurement characteristic of the optical fiber using a controller.

12. The method of claim 11, wherein retaining the optical fiber at a first location of the measurement system using a gripping wheel further comprises securing the optical fiber in a fixed angular orientation relative to the measurement position using the gripping wheel.

13. The method of claim 11, further comprising assigning a plurality of measurement characteristic ranges to each receiver of the collection system, and wherein automatically positioning one of the receivers comprises automatically positioning a particular receiver adjacent the output of the guide system corresponding to the measurement characteristic of the optical fiber and the corresponding measurement characteristic range assigned to the receiver.

14. The method of claim 11, wherein automatically determining the measurement characteristic comprises obtaining a plurality of measurement characteristic values of the optical fiber and determining an average measurement characteristic of the optical fiber from the plurality of measurement characteristic values.

15. The method of claim 14, wherein automatically positioning one of the receivers comprises automatically positioning one of the receivers adjacent the output of the guide system corresponding to the average measurement characteristic.

16. The method of claim 11, wherein guiding the optical fiber comprises disposing the guide system at an incline such that gravitational forces guide the optical fiber toward the measurement position.

17. An optical fiber sorting system, comprising:
    a measurement system operable to automatically determine a measurement characteristic of an optical fiber;
    a guide system operable to direct the optical fiber to a measurement position of the measurement system;
    a housing coupled to the guide system, the housing having a gripper rotatably coupled thereto, the gripper operable to rotate relative to the guide system to transport the optical fiber through the measurement position at a substantially constant rate;
    a collection system operable to receive the optical fiber from an outlet of the guide system; and
    a controller operable to automatically position a receiver of the collection system adjacent the outlet to receive the optical fiber, the receiver associated with the measurement characteristic of the optical fiber.

18. The system of claim 17, wherein the guide system comprises a passage defined by a plurality of spaced apart side walls, and wherein the guide system is disposed at an incline such that the optical fiber travels downwardly within the passage toward the measurement position.

19. The system of claim 17, wherein the gripper is further operable to secure the optical fiber in a fixed position relative to the measurement position.

20. The system of claim 17, wherein the gripper comprises a first gripper and a second gripper, the first gripper disposed on a side of the measurement position opposite the second gripper, and wherein each of the grippers is operable to secure and transport the optical fiber through the measurement position.

21. The system of claim 20, wherein the first and second grippers each comprise gripping wheels, and wherein each of the gripping wheels is operable to rotate at a substantially constant rate to transport the optical fiber through the measurement position.

22. The system of claim 21, wherein each of the gripping wheels comprises an inner portion and an outer portion, the outer portion constructed from a generally pliable material to secure the optical fiber between the outer portion and the guide system during rotation of the gripping wheel.

23. The system of claim 17, wherein a measurement range is assigned to each receiver of the collection system, and wherein the controller is operable to position a particular receiver adjacent the guide system corresponding to the measurement characteristic falling within the measurement range of the particular receiver.

24. The system of claim 17, further comprising an adjustment system operable to adjust a position of the measurement system relative to the guide system to align the measurement position of the measurement system with a location of the optical fibers as the optical fiber is transported through the measurement position.

25. The system of claim 17, wherein the guide system comprises a passage defined by a plurality of spaced apart tapered side walls, wherein the tapered side walls are operable to direct the optical fiber into the passage and toward the measurement position.

* * * * *